United States Patent [19]
Rankin et al.

[11] Patent Number: 5,312,293
[45] Date of Patent: May 17, 1994

[54] HEAD WASHING APPARATUS

[75] Inventors: Russel J. Rankin, Clear Mountain; Phillip R. Boyce, Murrarrie; Raymond M. White, Capalaba; John W. Buhot, Coorparoo; Darryl J. Heidke, Morningside; Andrew M. Leiner, Sunnybank; Andrew L. Finney, Marsden; Matthew Aquilini, Mt. Gravatt, all of Australia

[73] Assignees: Commonwealth Scientific & Industrial Research Organisation, Campbell; Meat Research Corporation, Sydney, both of Australia

[21] Appl. No.: 854,987
[22] PCT Filed: Oct. 29, 1990
[86] PCT No.: PCT/AU90/00522
 § 371 Date: Apr. 30, 1992
 § 102(e) Date: Apr. 30, 1992
[87] PCT Pub. No.: WO91/06219
 PCT Pub. Date: May 16, 1991

[30] Foreign Application Priority Data
 Nov. 3, 1989 [AU] Australia ............... PJ 7234

[51] Int. Cl.⁵ .................. A22B 5/00; A22C 17/08
[52] U.S. Cl. .................... 452/173; 452/179
[58] Field of Search ........... 452/173, 123, 179, 77, 452/81

[56] References Cited

U.S. PATENT DOCUMENTS

| | | | |
|---|---|---|---|
| 1,146,589 | 7/1915 | Morrison | 452/77 |
| 3,178,763 | 4/1965 | Kolman | 452/173 |
| 4,337,549 | 7/1982 | Anderson et al. | 452/173 |
| 4,468,839 | 9/1984 | Chittenden | 452/173 |

FOREIGN PATENT DOCUMENTS 2000013 1/1979 United Kingdom ........ 452/173

Primary Examiner—Willis Little
Attorney, Agent, or Firm—Lowe, Price, LeBlanc & Becker

[57] ABSTRACT

A head washing apparatus has a head support (20) which supports the animal head (15) so that the muzzle is directed upwardly. A plurality of nozzles (16, 17) direct water under pressure in a plurality of directions onto the animal head (15) so that water is directed into upwardly opening orifices (18). Head turning means (30) turns the head support (20) in increments relative to the nozzles (16, 17) so that water is directed onto the head (15) and into the orifices (18) by the nozzles while the head is in different orientations relative to the nozzles (16, 17). Conveyor means (24) conveys the head support (20) to and from the head washing station. The nozzles (16, 17) are mounted by a carriage (50) which tracks the movement of the head (15).

13 Claims, 2 Drawing Sheets

HEAD WASHING APPARATUS

FIELD OF THE INVENTION

This invention relates to washing of an animal head in the processing of an animal carcass in which the animal head is washed before recovery of meat such as the tongue and cheeks.

BACKGROUND OF THE PRIOR ART

It is known to wash the head of an animal such as in beef or sheep abattoirs by manually directing pressurised water onto the head and through orifices to clean the head for subsequent processing. For example, any loose hair and blood needs to be removed to enable clean cuts of meat such as the tongue and cheeks to be recovered from the head. Such manual operations contribute substantially to the total costs involved in the carcass processing operation.

SUMMARY OF THE DISCLOSURE

It is an object of the present invention to provide a head washing apparatus which enables an animal head to be automatically washed preparatory to recovery of meat cuts from the head.

According to the present invention there is provided a head washing apparatus for washing an animal head at a head washing station, the head washing apparatus being characterised by a head support which supports the animal head so that the head is in a position with the muzzle directed generally upwardly, a plurality of nozzles arranged for directing water under pressure in a plurality of directions onto the animal head at the head washing station so that water is directed into generally upwardly opening orifices of the animal head, head turning means for turning the head support and thereby turning the animal head relative to the nozzles so that water is directed onto the head and into the orifices by the nozzles while the head is in different orientations relative to the nozzles.

In a first preferred aspect of the invention there is provided a head washing apparatus for washing an animal head at a head washing station, the head washing apparatus being characterised by a head support which supports the animal head so that the head is in a position with the muzzle directed generally upwardly, conveyor means operatively associated with the head support and operative to convey the head support and an animal head supported thereby to the head washing station and operative to convey the head support and the animal head supported thereby away from the head washing station after a head washing operation, a plurality of nozzles arranged for directing water under pressure in a plurality of directions onto the animal head at the head washing station so that water is directed into generally upwardly opening orifices of the animal head, head turning means for turning the head support and thereby turning the animal head relative to the nozzles so that water is directed onto the head and into the orifices by the nozzles while the head is in different orientations relative to the nozzles.

Preferably the conveyor means comprises an overhead conveyor line and said head support comprises a support hook having a shank, the shank being coupled to the conveyor line so that the hook hangs downwardly from the conveyor line, the conveyor line being movable so as to advance the support hook and the animal head supported thereby to the head washing station and to convey the hook and the animal head away from the head washing station after the head washing operation. In this embodiment, the head support preferably includes a support bracket which is coupled to the conveyor line, the support hook being mounted at its upper end to the support bracket, the shank of the hook being rotatable about its axis so that the animal head supported by the hook can be rotated about the vertical axis of the shank.

The head turning means may comprise deflecting tabs which are mounted by the head support, the head turning means further including co-operating guides arranged so that as the head support is advanced, each of the deflecting tabs encounters a respective one of the guides and causes the hook to rotate about the vertical axis of the shank as the respective tab engages the co-operating guide is aligned with that guide. In one possible embodiment the deflecting tabs comprise a first and a second tab mounted to the shank of the support hook adjacent to the upper end of the shank, the first tab projecting from the shank in one plane and the second tab projecting from the shank at an angle to the first tab in top plan view, the two tabs being located at different heights along the shank, the guides comprising respective opposed guides located at the height of the respective tab, the guides having flared opening mouths into which the respective tab passes as the conveyor means advances the support hook so that the tab enters the space between the respective opposed guides, whereby the first tab, if it is not already in a position aligned to the path of travel, encounters and enters the associated facing guides so that the first tab is twisted and the hook on which the animal head is mounted is also twisted to a particular orientation, the first guide terminating after a distance and the second guide at the second height commencing a short distance downstream from the termination of the first guide whereby the second tab enters the second deflecting guide and turns the hook so that the animal head will adopt a known orientation regardless of the initial orientation of the head. The head turning means may comprise further guides located at the head washing station and arranged so as to be encountered by the tabs as the conveyor means advances the head support and thereby causing turning of the support hook through the different orientations relative to the nozzles.

In a second preferred aspect of the invention there is provided a head washing apparatus for washing an animal head at a head washing station, the head washing apparatus being characterised by a head support which supports the animal head so that the head is in a position with the muzzle directed generally upwardly, a plurality of nozzles arranged for directing water under pressure in a plurality of directions onto the animal head at the head washing station so that water is directed into generally upwardly opening orifices of the animal head, head turning means for turning the head support and thereby turn the animal head relative to the nozzles so that water is directed onto the head and into the orifices by the nozzles while the head is in different orientations relative to the nozzles, the head turning means being operable to turn the head support incrementally so that the head remains in substantially the same position relative to the nozzles for a period of time after which the head turning means is operative to turn the head relative to the nozzles.

In this embodiment, the head in a first stage of the washing operation may be located in a first known orientation and may be washed by water from the nozzles in that first orientation, the head turning means then being operative to turn the head support to a second known orientation where the head is washed during a second stage of the washing operation, the head turning means then being operative to turn the head support to a third known orientation in which the head is washed during a third stage of the washing operation. The head may be turned in increments of 90° so that the head remains in the first orientation for a predetermined proportion of the duration of the washing operation, the head then being turned through 90° for a further proportion of the duration of the washing operation.

The nozzles preferably include nostril nozzles arranged to direct water into the nostrils of the animal head when the animal head is in the second orientation in which the animal head has a particular relationship to the nostril nozzles, the second stage of the washing operation being of longer duration than the first stage so as to facilitate effective washing of the nasal orifices and passages into which the water is directed by the nostril nozzles.

The apparatus may further include a washing chamber in which the nozzles are located, the head support conveying the head into the chamber where the head washing operation occurs, the chamber being substantially enclosed on all sides and including an entrance opening through which the head is conveyed into the chamber, the entrance opening being closed after entry of the head into the chamber. The head support preferably depends downwardly from an overhead conveyor means, and the chamber has a top wall and provided with a longitudinal slot through the top wall of the chamber, the head support passing downwardly from the conveyor means through the slot and into the chamber whereby the head can be conveyed into the chamber as the head support enters the slot.

The nozzles may comprise spray nozzles which are directed in a plurality of directions, some of the spray nozzles being arranged to direct water sprays under pressure against the outside of the head from the sides and other ones of the spray nozzles being arranged to direct water under pressure downwardly onto the head and into orifices of the head including the nostrils and the mouth so that the water flushes the nasal and mouth cavities and the water flushes through those cavities and associated passages and drains from the lower portion of the head.

The head may be moved continuously through the head washing station, the apparatus including a carriage, the nozzles being mounted by the carriage and the carriage being movable by drive means along the general line of movement of the head so as to maintain the nozzles directed at the head, the carriage being retractable after the head washing operation to an initial position preparatory to washing of a subsequent animal head being advanced to the head washing station. In this embodiment, the apparatus may further include a tracking means operative to cause the drive means for the carriage to move the carriage so that the nozzles remain in substantial alignment with the head.

In one possible embodiment, the tracking means may include proximity sensing means mounted by the carriage and located generally adjacent to the path of the head support, the proximity sensing means being operative to sense the head support as it reaches and is advanced through the head washing station. The tracking means may also include a second sensor, the drive means for the carriage being operative to drive the carriage at a higher speed than the speed of advancing movement of the head support so that the carriage moves in response to the proximity sensing means until the second sensor senses the proximity of the head support, the drive means being responsive to the second sensor to stop the drive to the carriage, whereby the continuous movement of the head support causes the proximity sensing means to be operative again thereby restarting the carriage drive means and thereby enabling the carriage to generally track the movement of the head support through the head washing station.

In an alternative possible embodiment, the tracking means may comprise a switch which is operated by a probe located so as to be contacted by the head support, whereby when the head support first contacts the probe, the carriage drive means is operated, the carriage drive means being operative to drive the carriage faster than the speed of advance of the head support whereby when the carriage drive means drives the carriage to an extent that contact of the head support with the probe is lost, the carriage can stop until the head support again reaches the probe and in response the carriage drive means recommences to advance the carriage.

Brief Description of the Drawings

Possible and preferred features of the present invention will now be described with particular reference to the accompanying drawings. However it is to be understood that the features illustrated in and described with reference to the drawings are not to be construed as limiting on the scope of the invention. In the drawings.

Figure 1:
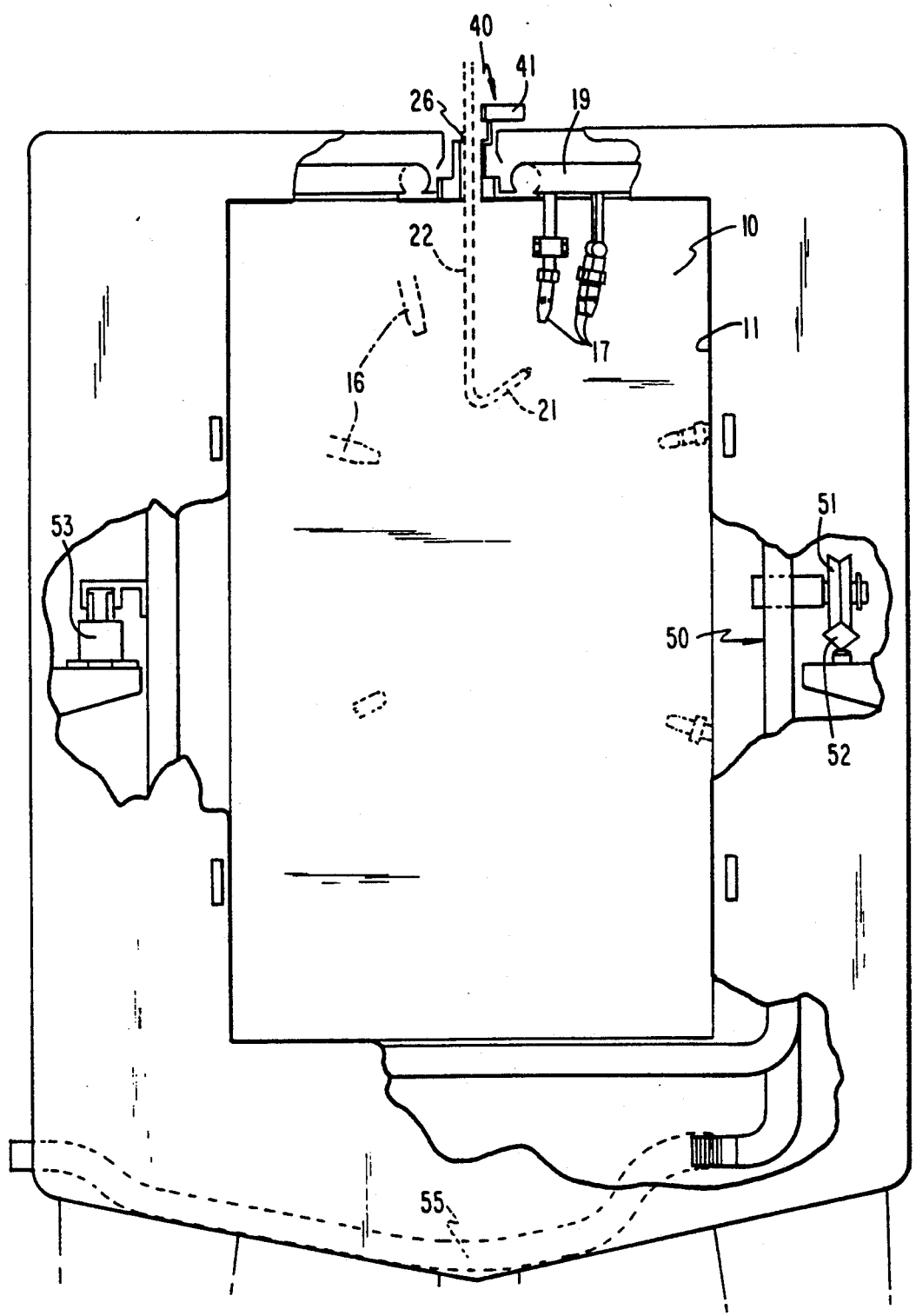
FIG. 1 is an end view of apparatus according to a preferred embodiment of the present invention, the view being along the line of movement of the head showing a chamber and a carriage mounting spray nozzles.

The head washing apparatus illustrated is for washing an animal head 15 which is supported by a head support 20 so that the head 15 is in a position with the muzzle directed generally upwardly. A plurality of nozzles 16, 17 such as spray nozzles are arranged for directing water under pressure in a plurality of directions onto the head 15 and into generally upwardly opening orifices 18 of the head. Head turning means 30 turns the head 15 relative to the spray nozzles 16, 17 so that water is in use directed onto the head 15 and into the orifices 18 by the nozzles while the head 15 is in different orientations relative to the nozzles 16, 17.

Description of the Preferred Embodiment

In known head processing lines, the animal head 15 may be supported by a head support 20 in the form of a hook 21 at the bottom end of a shank 22. The hook 21 which hangs downwardly from a moving conveyor 24. The moving conveyor 24 comprises a chain conveyor located overhead so that the hook 21 depends from the chain conveyor and the head 15 is continuously moved through washing and meat recovery stations along the head processing line. The hook 21 is mounted at its upper end to a support bracket 23 which allows the hook 21 to be rotated about its shank 22 so that the head 15 can be rotated about the vertical axis of the shank 22 during the manual processing of the head. The head washing apparatus illustrated is usable with this general kind of head support and head conveyor so as to be usable in existing head processing lines.

A spray chamber 10 encloses the spray nozzles 16, 17. The head support 20 conveys the head 15 into the chamber 10 where the head washing operation takes place. The spray chamber 10 is substantially enclosed on all sides in use and may therefore comprise a generally rectangular chamber having an entrance opening 11 which can be closed after the head 15 has been conveyed into the chamber through the entrance opening 11. Preferably the spray chamber 10 also includes an exit opening through which the head 15 is removed from the spray chamber 10 after the head washing operation. Both the entrance and exit openings may be closed during the head washing operation by selectively operable doors, entrance door 12 being shown.

Along the top of the spray chamber 10 there is slot 26 arranged so that the conveyor 24 extends along above the spray chamber 10 with the head support hook 21 extending downwardly from the conveyor 24 so as to pass through the slot 26 and into the chamber 10. The slot 26 extends from the entrance end of the chamber to the exit end so that the head 15 can be continuously conveyed through the chamber by means of the head support hook 21 passing along through the slot 26.

Located within the spray chamber 10 are the nozzles 16, 17 which are preferably spray nozzles and which are directed in a plurality of directions. Some of the spray nozzles 16 are arranged to direct water under pressure against the outside of the head 10 from the sides and other nozzles 17 are arranged to direct water under pressure downwardly onto the head 15 supported by the head support 20. The downwardly directed nozzles include at least one nozzle 17 which is arranged to direct water under pressure into an orifice of the head such as a nostril 18 or the mouth so that the water flushes the nasal and mouth cavities and the water flushes through those cavities and associated passages and drains from the lower portion of the head. In the preferred embodiment, two adjacent nostril spray nozzles 17 are provided, their location being such as to direct water under pressure into both nostrils 18 simultaneously.

The spray nozzles 16, 17 are supplied from supply lines such as supply manifold 19 which in use receives water from hose 55 under pressure, e.g. under mains pressure. The water need not be under high pressure and need not be heated although these are possible modifications that may be implemented.

Figure 2:
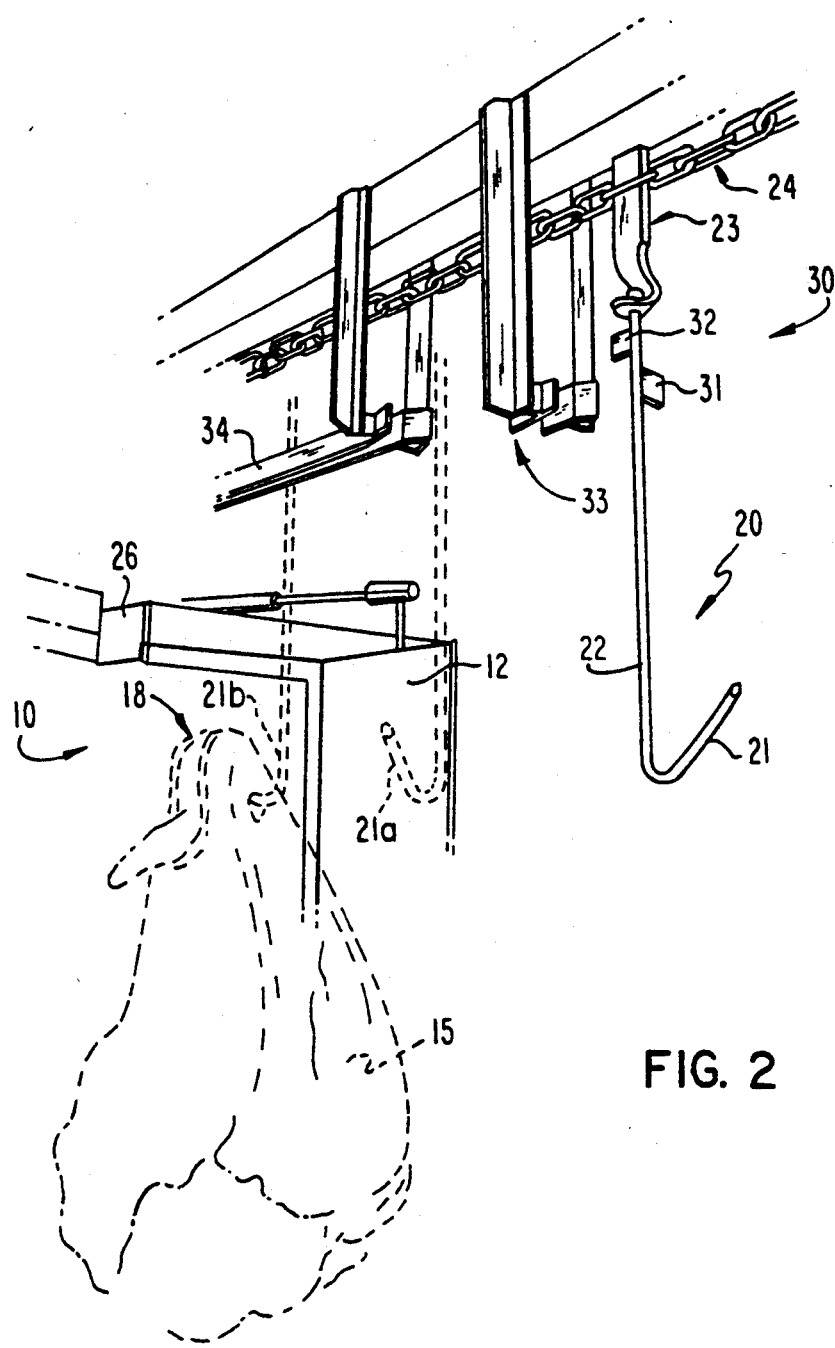
FIG. 2 is a fragmentary perspective view of the head support hook and associated head turning means usable with the present invention.

The head turning means 30 for turning the head 15 relative to the spray nozzles 16, 17 during the washing operation as illustrated operable to turn the head in increments. In the preferred embodiment the head 15 is turned in increments of 90° so that the head remains in one orientation for a predetermined proportion of the washing period, is then turned through 90° for a further proportion of the washing period. If desired the head may be rotated through different orientations twice during the head washing operation. With this arrangement, the head 15 enters the spray chamber 10 preferably in a first known orientation shown in broken line in FIG. 2 and is washed in that orientation for a first stage, is then turned through 90° for a second washing stage, and is then turned through a further 90° (180° from or back to the initial orientation) for a third stage of the washing operation. In the preferred embodiment, the head 15 enters the spray chamber 10 with the muzzle first for the first washing stage, is then turned 90° so as to substantially align the nostrils 18 to the nostril spray nozzles 17 for the second washing stage, the head 15 being then turned the further 90° for the third washing stage. Preferably, the second washing stage where the nostril spray nozzles 17 are arranged to direct water under pressure into the nostrils 18 is longer than the first or the third period so as to facilitate effective washing of the nasal orifices and passages into which the water is directed. During the second washing stage at least, water is also directed into the mouth.

The head turning means 30 is operative to turn the head support 20 which in the preferred embodiment comprises a support hook 21 having a shank 22 which extends generally vertically and a hook at the lower end of the shank. With this arrangement, the head turning means 30 is operative to turn the support hook 21 about the general vertical axis of the shank 22 so that the head 15 enters the spray chamber muzzle first for the first washing stage. The head turning means 30 comprises deflecting tabs 31, 32 mounted by the head support 20 and cooperating deflecting guides 33, 34 arranged so as to be encountered by the deflecting tabs 31, 32 as the head support 20 moves to and through the head washing apparatus. The deflecting tabs 31, 32 comprise tabs mounted to the shank 22 of the support hook 21, adjacent to the upper end of the shank, one tab 32 being generally aligned with the plane of the hook 21 and the other tab 31 being at right angles to the hook, the two tabs being located at different heights along the shank. The cooperating deflecting guides 33, 34 comprise facing guide rails located at the height of the respective tab 31, 32 and the guide rails having flared opening mouths into which the tab 31, 32 passes as the hook 21 travels along the conveyor 24 to and through the apparatus. With this arrangement, the first tab 31 arranged at right angles to the plane of the hook 21 encounters and enters the associated deflecting guide 33 so that the hook 21, if it is not already in a position at right angles to the path of travel, will be turned as the tab 31 enters the deflecting guide 33 and twists the hook 21 so that the tab 31 aligns with and enters the space between the guide rails 33. The first deflecting guide 33 then terminates and a short distance downstream the second deflecting guide 34 at the second height receives the second tab 32 which is now pointing at right angles to the line of advance. This second tab 32 is in the same plane as the hook 21 from which the head 15 is suspended so that as the second tab 32 enters the second deflecting guide 34, the tab 32 will be turned and the shank 22 of the hook 21 will twist so that the muzzle will now be leading regardless of the initial orientation of the head 15. As the head support 20 moves through the spray chamber 10, further deflecting guides (not shown) are arranged above the spray chamber 10 so as to be encountered by the tabs 31, 32 and cause turning of the support hook 21 through the various desired orientations.

In one possible embodiment, the head support 20 may be indexed through the head washing apparatus so that after the head turning means operates to turn the head 15 to a new orientation, the conveyor stops with the head arranged as desired in relation to the nozzles within the spray chamber 10 and the washing with the head in that particular orientation takes place. However, in the preferred embodiment illustrated, the head 15 is moved continuously through the spray chamber 10. In this preferred embodiment, the apparatus includes a carriage 50 to which the spray nozzles 16, 17 are mounted, the carriage 50 being movable along the line of movement of the head 15 so as to maintain the nozzles 16, 17 directed at the head. After the head washing operation, the carriage 50 can be retracted to its initial position preparatory to washing of a subsequent animal head entering the spray chamber 10. The carriage 50 may be mounted for movement along the length of the spray chamber 10 by any suitable means. The water supply manifold 19 extends upwardly and around the head support 20 in use, the water supply to the manifold 19 being passed through a flexible supply line 55. The drive means 53 for moving the carriage may be of any suitable construction and operation. For example the carriage 50 may be movable along longitudinal rails 52 by a double acting ram 53 located along the side internally of the spray chamber 10. The ram 53 may be a rodless pneumatic cylinder.

In the preferred embodiment in which the spray nozzles 16, 17 are mounted by the carriage 50, the apparatus preferably includes support tracking means 40 operative to cause the drive means 53 for the carriage 50 to move the carriage so that the nozzles 16, 17 remain in substantial alignment with the head 15. In this way the drive means 24 for the head support 20 may be independent of the drive means 53 for the carriage 50.

The support tracking means 40 may be of any suitable construction and arrangement. For example, in one possible arrangement, the support tracking means 40 may comprise proximity sensors 41 mounted by the carriage 50 generally adjacent to the path of the head support 20 such as the path of the shank 22 of the hook 21. With this arrangement, when a head support 20 having a head carried thereby (as sensed by a head sensing means such as an ultrasonic sensor located in proximity to the entrance opening of the spray chamber), enters the spray chamber 10 and is sensed by the first sensor 41, the door 12 at the entrance opening can be automatically closed, the water supply to the nozzles 16, 17 commenced and the drive means 53 for the carriage 50 activated to commence movement of the carriage 50. Preferably, the drive means 53 for the carriage 50 drives the carriage 50 at a higher speed than the speed of movement of the head support 20 so that the carriage 50 moves until a second sensor 41 senses the proximity of the head support 20 and stops the carriage drive means 53. The continuous movement of the head support 20 then causes the first sensor to operate, thus restarting the carriage drive means 53. In this way, the carriage 50 will track the movement of the head support 20 through the spray chamber 10. When the carriage 50 reaches the exit end of the chamber 10, the wash water supply can be stopped, the door at the exit opening can be opened and the carriage 50 retracted to its initial start position adjacent to the entrance opening 11 which is also reopened.

The support tracking means in an alternative embodiment to the two sensors 41 just described may include a single switch which is operated by a probe contacted by the head support 20 so that when the head support 20 first contacts the probe, the door 12 at the entrance opening 11 is closed, the water supply commenced and the carriage drive means 53 operated. When the carriage drive means 53 drives the carriage 50 to an extent that contact of the head support 20 with the probe is lost, the carriage 50 can stop until the head support 20 again reaches the probe and recommences the carriage drive means 53.

It will be seen that the preferred embodiment of the head washing apparatus as herein described and illustrated enables an animal head to be automatically washed preparatory to recovery of meat from the head. The apparatus is an enclosed system so that processors can work in proximity to the apparatus. The apparatus can be used on conventional head processing lines since the spray nozzle mounting carriage can track the movement of the head support hook. The head is turned automatically to different orientations so that the head can be washed externally and through orifices and passages in an effective manner. The apparatus can be a low pressure system.

It is to be understood that various alterations, modifications and/or additions may be made to the features of the possible and preferred embodiment(s) of the invention as herein described without departing from the scope of the invention as defined in the appended claims.

What is claimed is:

1. A head washing apparatus for washing an animal head at a head washing station, the head washing apparatus including:

a head support which supports the animal head so that the head is in a position with the muzzle directed generally upwardly;

conveyor means operatively associated with the head support and operative to convey the head support and an animal head supported thereby to the head washing station and operative to convey the head support and the animal head supported thereby away from the head washing station after a head washing operation, the conveyor means comprising an overhead conveyor line and said head support comprising a support hook having a shank, the shank being coupled to the conveyor line so that the hook hangs downwardly from the conveyor line, the conveyor line being movable so as to advance the support hook and the animal head supported thereby to the head washing station and to convey the hook and the animal head away from the head washing station after the head washing operation, the head support including a support bracket which is coupled to the conveyor line, the support hook being mounted at its upper end to the support bracket, the shank of the hook being rotatable about its axis so that the animal head supported by the hook can be rotated about the vertical axis of the shank;

a plurality of nozzles arranged for directing water under pressure in a plurality of directions onto the animal head at the head washing station so that water is directed under pressure into generally upwardly opening orifices including the mouth and nostrils of the animal head so that the water flushes the nasal and mouth cavities and the water flushes through those cavities and associated passages and drains from the lower portion of the head; and head turning means for turning the head support and thereby turning the animal head relative to the nozzles so that water is directed onto the head and into the orifices by the nozzles while the head is in different orientations relative to the nozzles, the head turning means comprising deflecting tabs which are mounted by the head support, the head turning means further including co-operating guides arranged so that as the head support is advanced, each of the deflecting tabs encounters a respective one of the guides and causes the hook to rotate about the vertical axis of the shank as the respective tab engages the co-operating guide is aligned with that guide, the deflecting tabs comprising a first and a second tab mounted to the shank of the support hook adjacent to the upper end of the shank, the first tab projecting from the shank in one plane and the second tab projecting from the shank at an angle to the first tab in top plan view, the two tabs being located at different heights along the shank, said guides comprising respective opposed guides located at the height of the respective tab, the guides having flared opening mouths into which the respective tab passes as the conveyor means advances the support hook so that the tab enters the space between the respective opposed guides, whereby the first tab, if it is not already in a position aligned to the path of travel, encounters and enters the associated facing guides so that the first tab is twisted and the hook on which the animal head is mounted is also twisted to a particular orientation, the first guide terminating after a distance and the second guide at the second height commencing a short distance downstream from the termination of the first guide whereby the second tab enters the second deflecting guide and turns the hook so that the animal head will adopt a known orientation regardless of the initial orientation of the head.

2. Apparatus as claimed in claim 1 wherein the head turning means comprises further guides located at the head washing station and arranged so as to be encountered by the tabs as the conveyor means advances the head support and thereby causing turning of the support hook through the different orientations relative to the nozzles.

3. Apparatus as claimed in claim 2 wherein the head is turned in increments of 90° so that the head remains in the first orientation for a predetermined proportion of the duration of the washing operation, the head then being turned through 90° for a further proportion of the duration of the washing operation.

4. A head washing apparatus for washing an animal head at a head washing station through which the head is moved continuously during a head washing operation, the head washing apparatus including:
a head support which supports the animal head so that the head is in a position with the muzzle directed generally upwardly;
a plurality of nozzles arranged for directing water under pressure in a plurality of directions onto the animal head at the head washing station so that water is directed under pressure into generally upwardly opening orifices including the mouth and nostrils of the animal head so that the water flushes the nasal and mouth cavities and the water flushes through those cavities and associated passages and drains from the lower portion of the head;
a carriage, the nozzles being mounted by the carriage and the carriage being movable by drive means along the general line of movement of the head so as to maintain the nozzles directed at the head, the carriage being retractable after the head washing operation to an initial position preparatory to washing of a subsequent animal head being advanced to the head washing station; and
head turning means for turning the head support and thereby turning the animal head relative to the nozzles so that water is directed onto the head and into the orifices by the nozzles while the head is in different orientations relative to the nozzles.

5. Apparatus as claimed in claim 4 wherein the apparatus further includes a tracking means operative to cause the drive means for the carriage to move the carriage so that the nozzles remain in substantial alignment with the head.

6. Apparatus as claimed in claim 5 wherein the tracking means includes proximity sensing means mounted by the carriage and located generally adjacent to the path of the head support, the proximity sensing means being operative to sense the head support as it reaches and is advanced through the head washing station.

7. Apparatus as claimed in claim 6 wherein the tracking means includes a second sensor, the drive means for the carriage being operative to drive the carriage at a higher speed than the speed of advancing movement of the head support so that the carriage moves in response to the proximity sensing means until the second sensor senses the proximity of the head support, the drive means being responsive to the second sensor to stop the drive to the carriage, whereby the continuous movement of the head support causes the proximity sensing means to be operative again thereby restarting the carriage drive means and thereby enabling the carriage to generally track the movement of the head support through the head washing station.

8. Apparatus as claimed in claim 5 wherein the tracking means comprises a switch which is operated by a probe located so as to be contacted by the head support, whereby when the head support first contacts the probe, the carriage drive means is operated, the carriage drive means being operative to drive the carriage faster than the speed of advance of the head support whereby when the carriage drive means drives the carriage to an extent that contact of the head support with the probe is lost, the carriage can stop until the head support again reaches the probe and in response the carriage drive means recommences to advance the carriage.

9. A method for washing an animal head at a head washing station, the head washing method including the steps of:
supporting the animal head so that the head is in a position with the muzzle directed generally upwardly;
directing water under pressure from a plurality of nozzles and in a plurality of directions onto the animal head at the head washing station so that water is being directed under pressure into generally upwardly opening orifices including the mouth and nostrils of the animal head and so that the water is flushing the nasal and mouth cavities and the water is flushing through those cavities and associated passages and is draining form the lower portion of the head; and
turning the animal head relative to the nozzles so that water is being directed onto the head and into the orifices by the nozzles while the head is in different orientations relative to the nozzles.

10. A method as claimed in claim 9, wherein:
the head turning step comprises turning the head incrementally so that the head remains in substantially the same position relative to the nozzles for a period of time after which the head is turned further relative to the nozzles.

11. A method as claimed in claim 10, wherein:

the head in a first stage of the washing operation is located in a first known orientation and is washed by water from the nozzles in that first orientation, the head then being turned to a second known orientation where the head is washed during a second stage of the washing operation, the head then being turned to a third known orientation in which the head is washed during a third stage of the washing operation.

12. A method as claimed in claim 11, wherein:
the head is turned in increments of 90° so that the head remains in the first orientation for a predetermined proportion of the duration of the washing operation, the head then being turned through 90° for a further proportion of the duration of the washing operation.

13. A method as claimed in claim 11, wherein:
the nozzles include nostril nozzles arranged to direct water into the nostril of the animal head when the animal head is in said second orientation in which the animal head has a particular relationship to the nostril nozzles, the second stage of the washing operation being of longer duration than the first stage so as to facilitate effective washing of the nasal orifices and passages into which the water is directed by the nostril nozzles.

* * * * *